(12) United States Patent
Shibata

(10) Patent No.: US 11,243,543 B2
(45) Date of Patent: Feb. 8, 2022

(54) VEHICLE CONTROL APPARATUS, COMPUTER READABLE STORAGE MEDIUM, AND VEHICLE

(71) Applicant: HONDA MOTOR CO., LTD., Tokyo (JP)

(72) Inventor: Tomohiro Shibata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 276 days.

(21) Appl. No.: 16/287,942

(22) Filed: Feb. 27, 2019

(65) Prior Publication Data

US 2019/0278287 A1 Sep. 12, 2019

(30) Foreign Application Priority Data

Mar. 6, 2018 (JP) .............................. JP2018-040163

(51) Int. Cl.
*G05D 1/02* (2020.01)
*B60R 25/01* (2013.01)
*B60L 53/14* (2019.01)

(52) U.S. Cl.
CPC .......... *G05D 1/0225* (2013.01); *B60R 25/01* (2013.01); *G05D 1/0214* (2013.01); *B60L 53/14* (2019.02); *G05D 2201/0213* (2013.01)

(58) Field of Classification Search
CPC ............... G05D 1/0225; G05D 1/0214; G05D 2201/0213; B60R 25/01; B60L 53/14; B60L 2250/26; B60L 2260/26; B60L 53/37; Y02T 90/12; Y02T 90/14; Y02T 10/7072; Y02T 10/70; B60W 50/00; B60W 2050/0043
See application file for complete search history.

(56) References Cited

FOREIGN PATENT DOCUMENTS

JP 2015116010 A 6/2015

*Primary Examiner* — Brian P Sweeney

(57) ABSTRACT

A vehicle control apparatus is provided, comprising: a state switching unit that switches a state of a vehicle between a first state in which the vehicle accepts a driving manipulation and a second state in which the vehicle does not accept a driving manipulation; a distance acquiring unit that acquires a distance between the vehicle and an charging facility; and a switching control unit that causes the state switching unit to switch the state of the vehicle to the first state if the vehicle is in the second state and the distance between the vehicle and the charging facility is equal to or less than a predetermined threshold.

15 Claims, 8 Drawing Sheets

VEHICLE CONTROL APPARATUS, COMPUTER READABLE STORAGE MEDIUM, AND VEHICLE

The contents of the following Japanese patent application are incorporated herein by reference: NO. 2018-040163 filed on Mar. 6, 2018.

BACKGROUND

1. Technical Field

The present invention relates to a vehicle control apparatus, a computer readable storage medium and a vehicle.

2. Related Art

A system in which a charging facility is installed in a parking area, such as a store, so that a vehicle utilizing the parking area can be charged has been known (for example, see Patent Document 1).

PRIOR ART LITERATURE

[Patent Document]
[Patent Document 1] Japanese Patent Application Publication No. 2015-116010

SUMMARY

It is desirable that a plurality of vehicles can efficiently utilize a charging facility.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
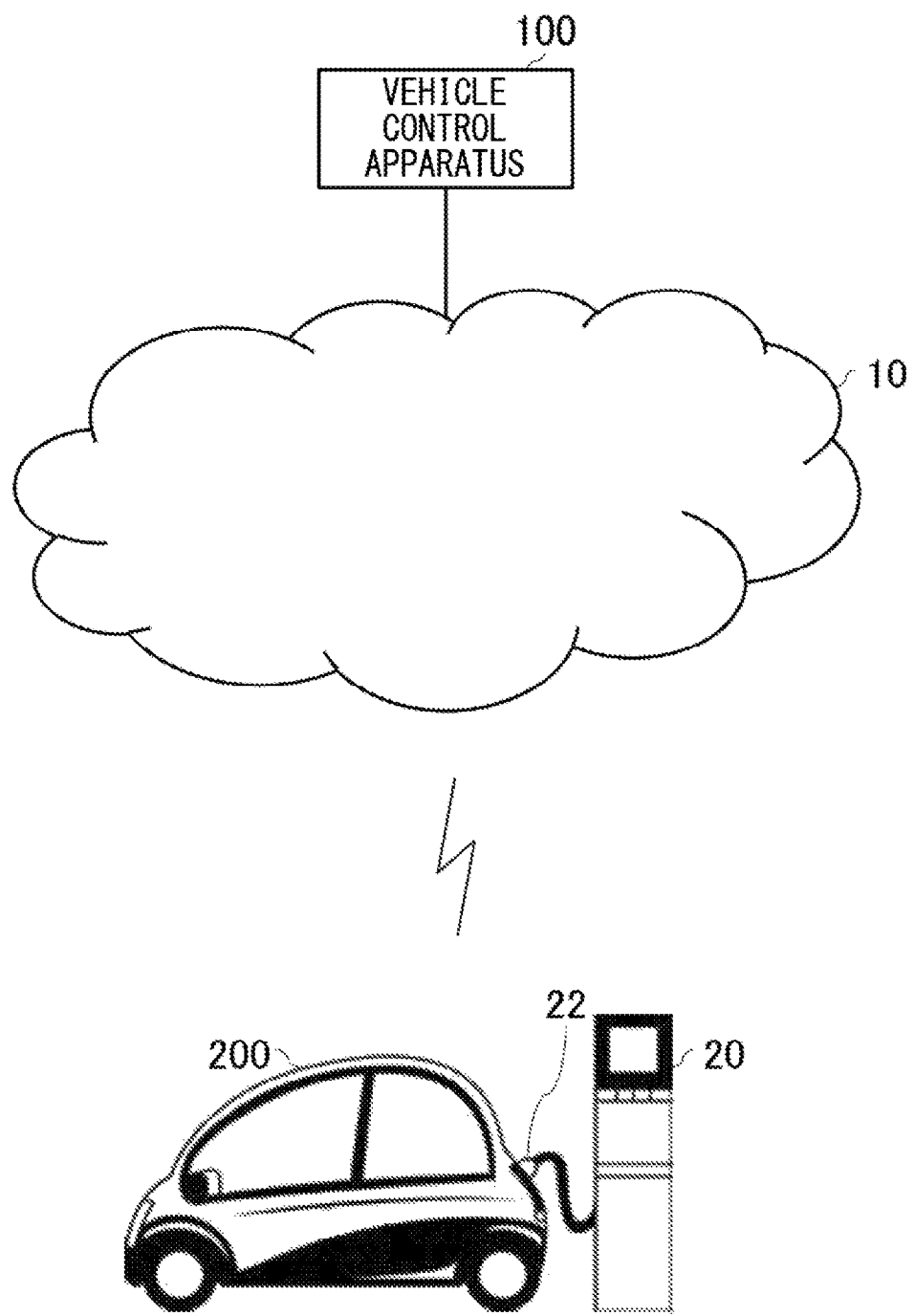
FIG. 1 schematically shows one example of a communications environment of a vehicle control apparatus 100.

FIG. 1 schematically shows one example of a communications environment of a vehicle control apparatus 100. The vehicle control apparatus 100 controls a vehicle 200 via a network 10. The vehicle control apparatus 100 may also control a charging facility 20 via a network 10.

The network 10 may be any network. For example, the network 10 may include at least any one of an Internet, a mobile phone network such as so-called 3rd Generation (3G), Long Term Evolution (LTE), 4th Generation (4G) and 5th Generation (5G), a public wireless local area network (LAN) and a private network. The vehicle control apparatus 100 and the network 10 may be wiredly connected to each other. The vehicle control apparatus 100 and the network 10 may also be wirelessly connected to each other. The network 10 and the vehicle 200 may be wirelessly connected to each other. The network 10 and the vehicle 200 may also be wiredly connected to each other.

The vehicle 200 can be charged by the charging facility 20, and may also be any vehicle as long as the vehicle 200 is a vehicle that can communicate with the vehicle control apparatus 100. The vehicle 200 can be coupled with a charging plug 22 of the charging facility 20, and receives electric power from the charging facility 20 via the charging plug 22 to charge a battery thereof.

The vehicle 200 has an acceptable state in which the vehicle 200 accepts a driving manipulation, and a non-acceptable state in which the vehicle 200 does not accept a driving manipulation. The acceptable state is a state in which the vehicle 200 accepts a driving manipulation by a person and is driven, for example. The non-acceptable state is a state in which the vehicle 200 does not accept a driving manipulation by a person and is not driven, for example. The acceptable state may be one example of a first state. The non-acceptable state may be one example of a second state.

The acceptable state and the non-acceptable state may be switchable to each other by various publicly-known methods. For example, the acceptable state and the non-acceptable state are switched to each other by using a key. For example, the acceptable state and the non-acceptable state are switched to each other by turning a key inserted into a key cylinder. That the key inserted into the key cylinder has been turned while the vehicle 200 is in the non-acceptable state may be one example of the first condition. If the key is a so-called smart key, the state of the vehicle 200 is switched between the acceptable state and the non-acceptable state by a so-called start switch. That the start switch is set in the ON state while the vehicle 200 is in the non-acceptable state may also be one example of the first condition. When the vehicle 200 is a vehicle driven by an engine, the start switch may be a so-called engine switch, and when the vehicle 200 is a vehicle such as an electric vehicle driven by a motor, the start switch may be a so-called power switch. Also, the state of the vehicle 200 may be switchable between the acceptable state and the non-acceptable state by a remote control.

The charging facility 20 is, for example, installed in a parking area of a store and the like for sharing. A user of the vehicle 200 parks the vehicle 200 at a parking space in which the charging facility 20 has been installed and couples the vehicle 200 with the charging plug 22 to start charging, for example. If the charging takes time, the user of the vehicle 200 switches the state of the vehicle 200 to the non-acceptable state, locks doors of the vehicle 200 and moves apart from the vicinity of the vehicle 200 to do shopping or the like at the store. Here, in a case where the user is not back and the vehicle 200 is not moved even if the charging of the vehicle 200 has been completed, a user of another vehicle cannot utilize the charging facility 20. For that reason, usage efficiency of the charging facility 20 is lowered.

The vehicle control apparatus 100 according to the present embodiment acquires a distance between the vehicle 200 and the charging facility 20, and if the vehicle 200 is in the non-acceptable state and the distance between the vehicle 200 and the charging facility 20 is equal to or less than a predetermined threshold, performs a control to switch the state of the vehicle 200 to the acceptable state. The vehicle control apparatus 100 may perform a control to switch the state of the vehicle 200 to the acceptable state and to unlock a door lock of the vehicle 200. The vehicle control apparatus 100 switches the state of the vehicle 200 by transmitting a control signal to the vehicle 200 via the network 10, for example. Accordingly, this can enable a third party such as a user of another vehicle who desires to use the charging facility 20 to move the vehicle 200.

The vehicle control apparatus 100 may receive the distance between the vehicle 200 and the charging facility 20 from the vehicle 200. Also, the vehicle control apparatus 100 may also receive the distance between the vehicle 200 and the charging facility 20 from the charging facility 20. Also, the vehicle control apparatus 100 may also receive the distance between the vehicle 200 and the charging facility 20 via the network 10 from a monitoring apparatus (not shown in the drawings) that monitors a surrounding area of the charging facility 20, for example.

The vehicle control apparatus 100 may also perform a control to switch the state of the vehicle 200 to the acceptable state under a condition that the distance between the vehicle 200 and the charging facility 20 is equal to or less than the predetermined threshold and the charging of the vehicle 200 by the charging facility 20 has been completed. Accordingly, until the charging of the vehicle 200 is completed, the vehicle 200 can be prohibited from being moved by a third party. Also, accordingly, after the charging of the vehicle 200 is completed, the charging of another vehicle can be made possible immediately even if the user of the vehicle 200 is not back to the vehicle 200, and the usage efficiency of the charging facility 20 can be improved.

The vehicle control apparatus 100 may also perform a control to switch the state of the vehicle 200 to the acceptable state under a condition that the distance between the vehicle 200 and the charging facility 20 is equal to or less than the predetermined threshold and the charging plug 22 is removed from the vehicle 200. If a set specification is that the charging plug 22 can be removed from the vehicle 200 by anyone when the charging of the vehicle 200 by the charging facility 20 is completed, the vehicle 200 can be prohibited from being moved by the third party until the charging is completed, and the vehicle 200 can be permitted to be moved by the third party after the charging is completed by performing such a control.

If the vehicle 200 is a vehicle that can be automatically driven, the vehicle control apparatus 100 may also cause the vehicle 200 to move by the automatic driving after causing the state of the vehicle 200 to be switched to the acceptable state. By causing the vehicle 200 to move by automatic driving after causing the state of the vehicle 200 to be switched to the acceptable state under the condition that the charging of the vehicle 200 is completed, for example, an environment in which the vehicle 200 automatically moves apart from the charging facility 20 when the charging of the vehicle 200 is completed can be achieved.

Also, by causing the vehicle 200 to move by automatic driving after causing the state of the vehicle 200 to be switched to the acceptable state under the condition that the charging plug 22 is removed from the vehicle 200, for example, an environment in which the vehicle 200 automatically moves apart from the charging facility 20 in accordance with the removal of the charging plug 22 from the vehicle 200 by a third party can be achieved.

The vehicle control apparatus 100 may also perform a control to switch the state of the vehicle 200 to the acceptable state under the condition that the distance between the vehicle 200 and the charging facility 20 is equal to or less than the predetermined threshold and a short-distance radio communication unit included in the vehicle 200 receives predetermined data. The short-distance radio communication unit included in the vehicle 200 receives, from an electronic card, card data recorded in the electronic card, for example. The vehicle control apparatus 100 switches the state of the vehicle 200 to the acceptable state under a condition that the short-distance radio communication unit included in the vehicle 200 has received the card data recorded in the electronic card used as a permit, for example. Accordingly, the switching of the state of the vehicle 200 to the acceptable state by the vehicle control apparatus 100 can be limited to a case where a third party owns the electronic card is positioned in the vicinity of the vehicle 200. As a result, an environment in which only a third party who owns the permit can cause the vehicle 200 to move can be achieved, for example.

Figure 2:
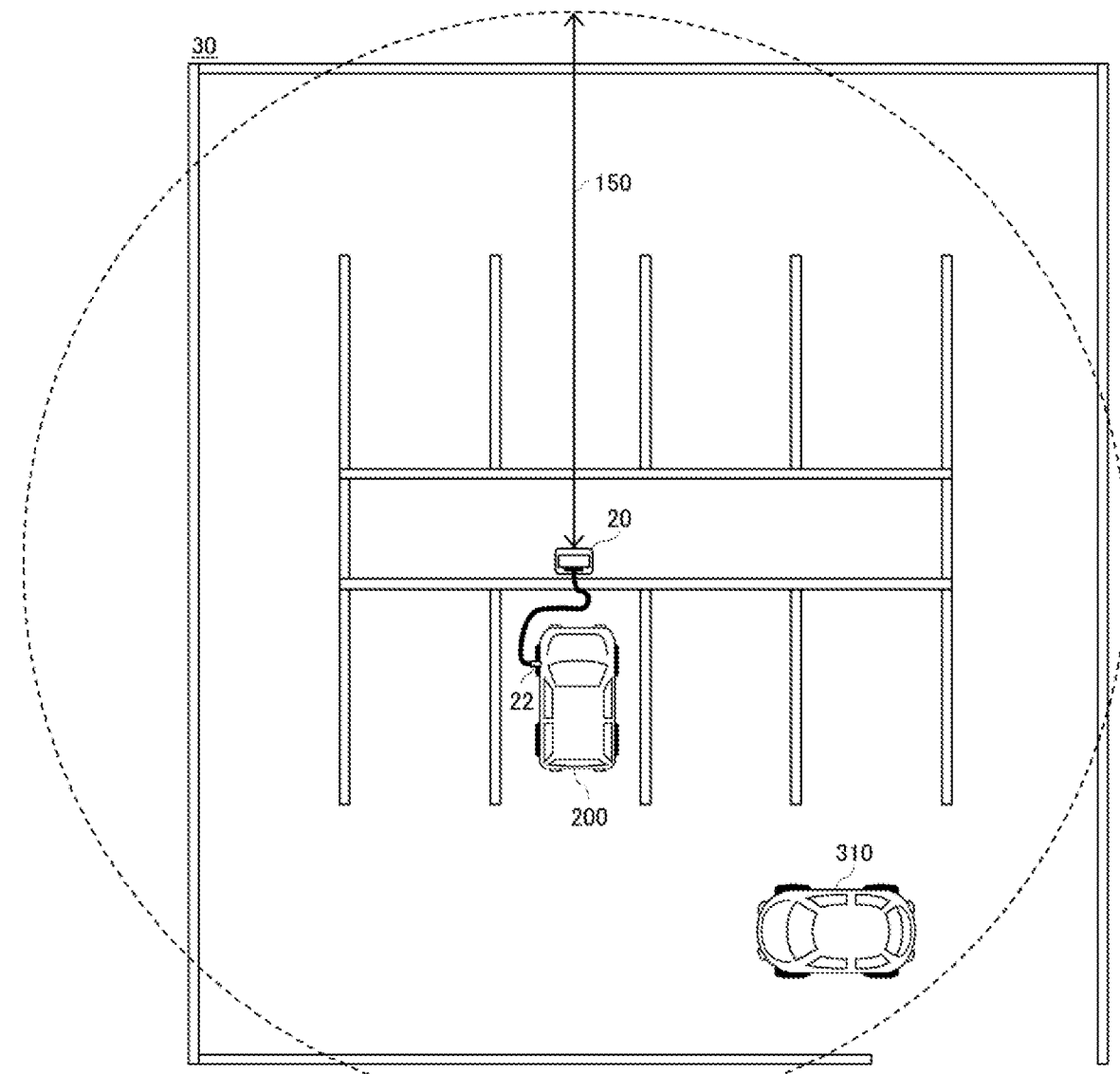
FIG. 2 is an explanatory drawing for describing a control by the vehicle control apparatus 100.

FIG. 2 is an explanatory drawing for describing control by the vehicle control apparatus 100. Here, a state in which the vehicle 200 is charged by the charging facility 20 within the parking area 30 and the charging has been completed is described for an example. In this case, even if the charging of the vehicle 200 has been completed, a user of a vehicle 310 who desires to use the charging facility 20 cannot use the charging facility 20.

The vehicle control apparatus 100 causes the state of the vehicle 200 to be switched to the acceptable state under a condition that the distance between the vehicle 200 and the charging facility 20 is equal to or less than a threshold 150 and the charging of the vehicle 200 by the charging facility 20 has been completed. Accordingly, the user of the vehicle 310 can cause the vehicle 200 to move to a neighboring parking position, for example, and can charge his/her vehicle 310 by using the charging facility 20.

After causing the state of the vehicle 200 to be switched to the acceptable state, the vehicle control apparatus 100 may cause the state of the vehicle 200 to be switched to the non-acceptable state in accordance with a situation in which the distance between the vehicle 200 and the charging facility 20 increases to exceed the threshold 150. Accordingly, the vehicle 200 can be prevented from being moved from the charging facility 20 by a distance beyond the threshold 150. In the example shown in FIG. 2, the vehicle 200 can be moved by the third party and the vehicle 200 can be prevented from being taken out of the parking area 30 by the third party.

After the state of the vehicle 200 is switched to the acceptable state, the vehicle control apparatus 100 may also control the charging facility 20 not to charge another vehicle until the vehicle 200 is moved to a predetermined position. The predetermined position is, for example, another parking space within the parking area 30. Accordingly, for example, provided that the user of the vehicle 310 causes the vehicle 200 to move to another parking space within the parking area 30, that the charging of the vehicle 310 is performed by using the charging facility 20 can be possible. That is, accordingly, that the user of the vehicle 310 causes the vehicle 200 to be moved to a place other than the other parking space within the parking area 30 can be suppressed.

Although FIG. 1 and FIG. 2 are described by using an example in which the charging facility 20 charges the vehicle 200 via the charging plug 22, the charging facility 20 is not limited to this. The charging facility 20 may also charge the vehicle 200 by non-contact charge. In this case, for example, the charging facility 20 is buried under the ground of the parking space of the parking area 30.

Figure 3:
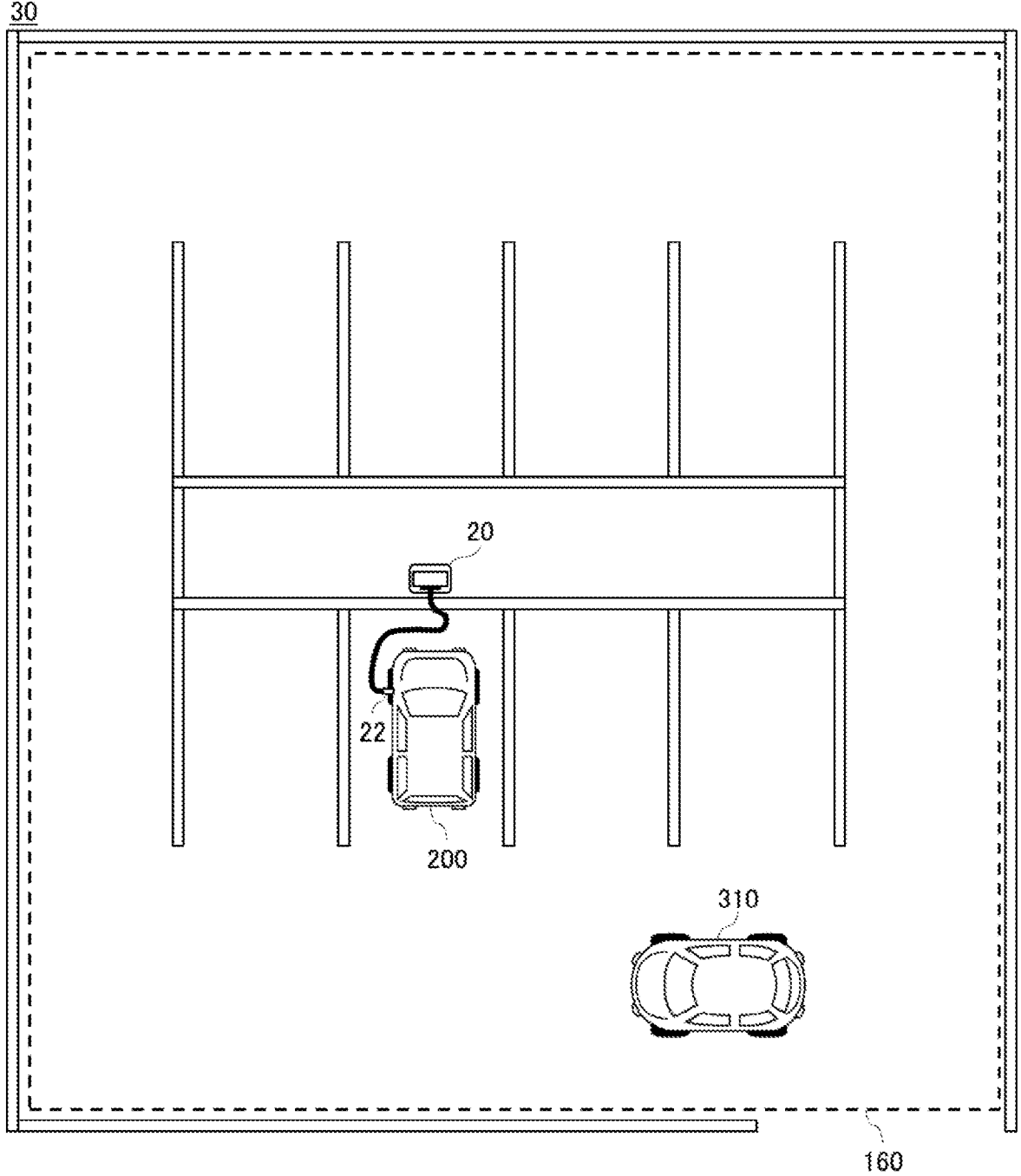
FIG. 3 is an explanatory drawing for describing the control by the vehicle control apparatus 100.

FIG. 3 is an explanatory drawing for describing the control by the vehicle control apparatus 100. Here, different respects from FIG. 2 are mainly described. The vehicle control apparatus 100 shown in FIG. 3 causes the state of the vehicle 200 is to be switched to the acceptable state in a case where the vehicle 200 is in the non-acceptable state and the position of the vehicle 200 is within a region 160 predetermined corresponding to the charging facility 20. Accordingly, the user of the vehicle 310 can cause the vehicle 200 to move to a neighboring parking position, for example, and can charge his/her vehicle 310 by using the charging facility 20. The region 160 can be arbitrarily set in some cases.

After causing the state of the vehicle 200 to be switched to the acceptable state, the vehicle control apparatus 100 may cause the state of the vehicle 200 to be switched to the non-acceptable state in accordance with a situation in which the position of the vehicle 200 is out of the region 160. Accordingly, the vehicle 200 can be prevented from being moved out of the region 160. In the example shown in FIG. 3, the vehicle 200 can be moved by the third party and the vehicle 200 can be prevented from being taken out of the parking area 30 by the third party.

Figure 4:
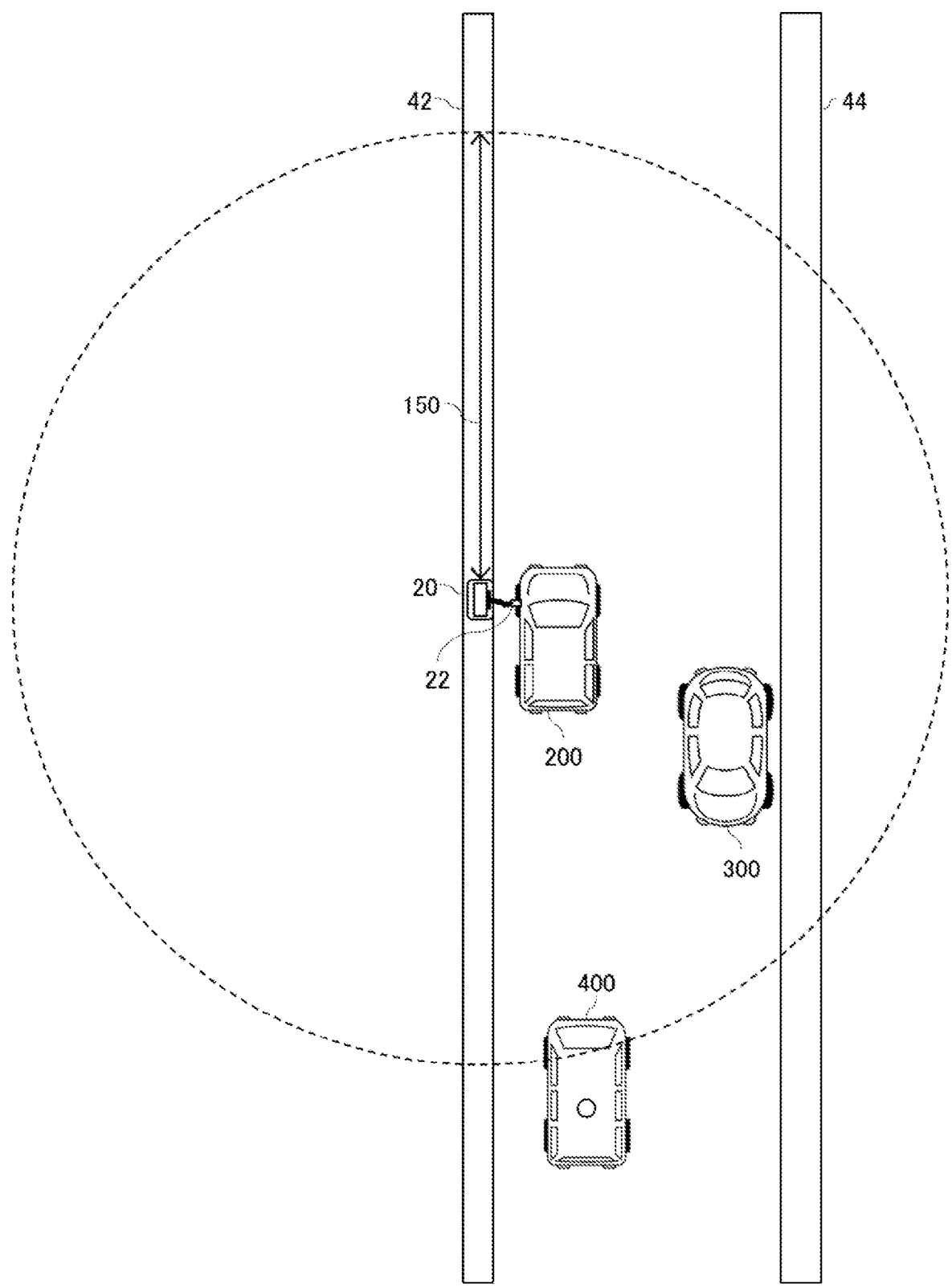
FIG. 4 is an explanatory drawing for describing the control by the vehicle control apparatus 100.

FIG. 4 is an explanatory drawing for describing the control by the vehicle control apparatus 100. FIG. 4 illustrates a situation in which on a road held between a wall 42 and a wall 44, a course of an emergency vehicle 400 is blocked by the vehicle 200, which is being charged by the charging facility 20 installed in the wall 42, and a parked vehicle 300.

In the present example, the vehicle control apparatus 100 causes the state of the vehicle 200 to be switched to the acceptable state under a condition that the distance between the vehicle 200 and the charging facility 20 is equal to or less than threshold 150 and the emergency vehicle 400 passes through the surrounding area of the vehicle 200. Accordingly, the vehicle 200 can be movable by occupants of the emergency vehicle 400, pedestrians walking near the vehicle 200, or the like, and the course of the emergency vehicle 400 can be ensured.

Even if in a case where the state of the vehicle 200 is set to be switched to the acceptable state under the condition that the distance between the vehicle 200 and the charging facility 20 is equal to or less than the threshold 150 and the charging of the vehicle 200 has been completed, when a condition that the emergency vehicle 400 passes through the surrounding area of the vehicle 200 is satisfied, the vehicle control apparatus 100 may cause the state of the vehicle 200 to be switched to the acceptable state even if the charging of the vehicle 200 is not completed yet. Accordingly, even if the charging of the vehicle 200 is not completed yet, the vehicle 200 can be movable by the occupants of the emergency vehicle 400, the pedestrians walking near the vehicle 200, or the like.

When receiving, from the vehicle 200, notification data notifying that the emergency vehicle 400 is positioned near the vehicle 200, the vehicle control apparatus 100 determines that the emergency vehicle 400 passes through the surrounding area of the vehicle 200, for example. For example, by recognizing a sound emitted by the emergency vehicle or analyzing an image captured by an in-vehicle camera, the vehicle 200 detects that the emergency vehicle 400 is positioned near the vehicle 200 and transmits the notification data to the vehicle control apparatus 100. Also, the vehicle control apparatus 100 may also receive the notification data via the network 10 from a monitoring apparatus that monitors a status of a vehicle that travels on a road in each location.

After causing the state of the vehicle 200 is to be switched to the acceptable state, the vehicle control apparatus 100 may cause the state of the vehicle 200 to be switched to the non-acceptable state in accordance with a situation in which the distance between the vehicle 200 and the charging facility 20 increases to exceed the threshold 150. Accordingly, the vehicle 200 can be prevented from being moved by a distance beyond a range of the threshold 150.

Figure 5:
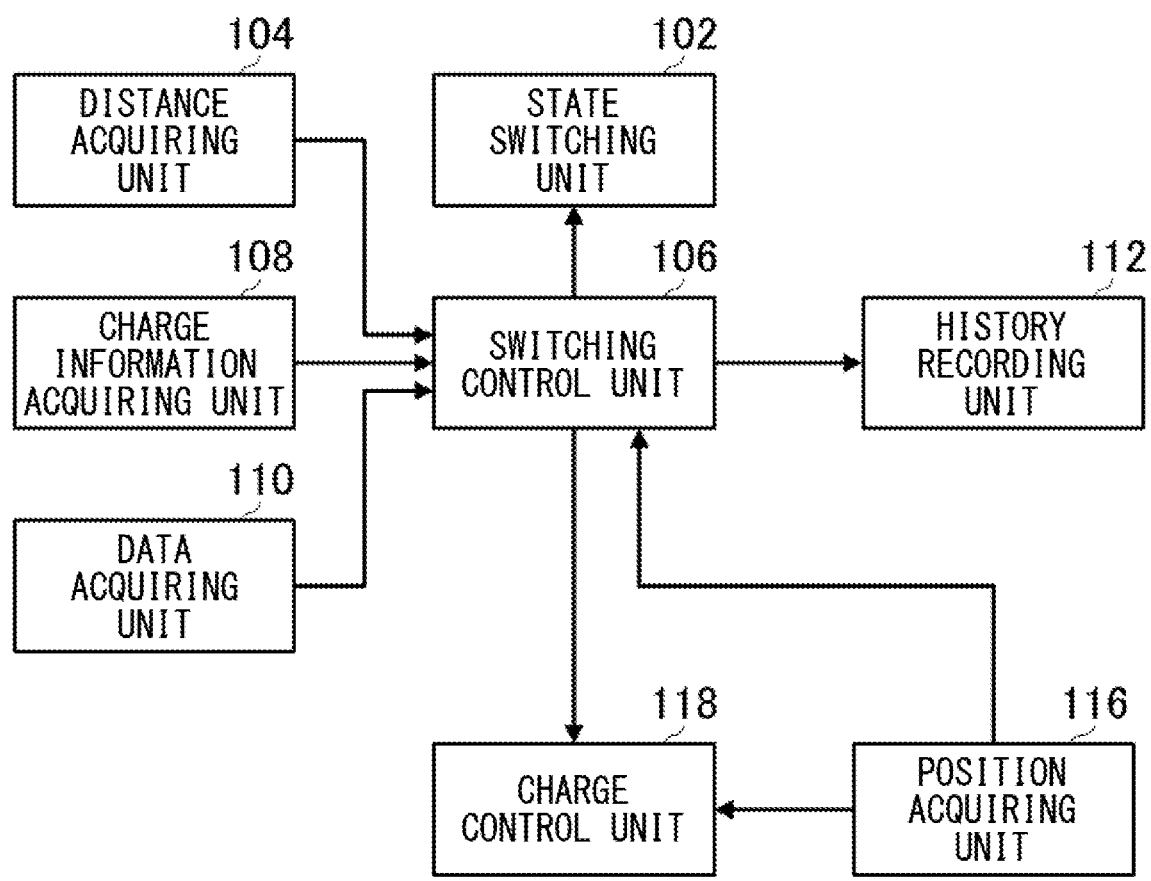
FIG. 5 schematically shows one example of a functional configuration of the vehicle control apparatus 100.

FIG. 5 schematically shows one example of a functional configuration of the vehicle control apparatus 100. The vehicle control apparatus 100 includes a state switching unit 102, a distance acquiring unit 104, a switching control unit 106, a charge information acquiring unit 108, a data acquiring unit 110, a history recording unit 112, a position acquiring unit 116 and a charging control unit 118. Note that the vehicle control apparatus 100 does not necessarily include all of these components.

The state switching unit 102 switches the state of the vehicle 200 between the acceptable state and the non-acceptable state. The state switching unit 102 switches the state of the vehicle 200 from the acceptable state to the non-acceptable state by transmitting, to the vehicle 200, a control signal for switching the state from the acceptable state to the non-acceptable state, for example. Also, the state switching unit 102 switches the state of the vehicle 200 from the non-acceptable state to the acceptable state by transmitting, to the vehicle 200, a control signal for switching the state from the non-acceptable state to the acceptable state, for example.

The distance acquiring unit 104 acquires the distance between the vehicle 200 and the charging facility 20. The distance acquiring unit 104 receives the distance between the vehicle 200 and the charging facility 20 from the vehicle 200, for example. The vehicle 200 may measure the distance to the charging facility 20 by using any method. Also, the distance acquiring unit 104 receives the distance between the vehicle 200 and the charging facility 20 from the charging facility 20, for example. The charging facility 20 may measure the distance to the vehicle 200 by using any method. Also, the distance acquiring unit 104 may also receive the distance between the vehicle 200 and the charging facility 20 from the monitoring apparatus that monitors the charging facility 20. The monitoring apparatus derives the distance between the vehicle 200 and the charging facility 20 by analyzing a monitor image, for example.

The switching control unit 106 causes the state switching unit 102 to switch the state of the vehicle 200 to the acceptable state if the vehicle 200 is in the non-acceptable state and the distance acquired by the distance acquiring unit 104 is equal to or less than a predetermined first threshold. After causing the state switching unit 102 to switch the state of the vehicle 200 to the acceptable state, the switching control unit 106 causes the state switching unit 102 to switch the state of the vehicle 200 to the non-acceptable state in accordance with a situation in which the distance between the vehicle 200 and the charging facility 20 increases to exceed a predetermined second threshold. The first threshold and the second threshold may be the same. Also, the first threshold and the second threshold may also be different from each other. For example, the second threshold may also be more than the first threshold.

The charge information acquiring unit 108 acquires charge information that indicates a charging status of the vehicle 200 by the charging facility 20. The charge information acquiring unit 108 acquires charge information that indicates whether the charging of the vehicle 200 by the charging facility 20 is completed or not, for example. Also, the charge information acquiring unit 108 acquires charge information that indicates a remaining charged amount of an electrical storage device of the vehicle 200, for example. Also, the charge information acquiring unit 108 acquires charge information that indicates whether the charging plug 22 of the charging facility 20 is coupled with the vehicle 200 or not, for example. The charge information acquiring unit 108 may receive the charge information from the charging facility 20. The charge information acquiring unit 108 may also receive the charge information from the vehicle 200.

The switching control unit 106 may cause the state switching unit 102 to switch the state of the vehicle 200 to the acceptable state under a condition that the distance acquired by the distance acquiring unit 104 is equal to or less than the predetermined first threshold and the remaining charged amount indicated by the charge information acquired by the charge information acquiring unit 108 is equal to or more than a predetermined value. Also, the switching control unit 106 may cause the state switching unit 102 to switch the state of the vehicle 200 to the acceptable state under a condition that the distance acquired by the distance acquiring unit 104 is equal to or less than the predetermined first threshold and the charge information acquired by the charge information acquiring unit 108 indicates that the charging plug 22 is not connected to the vehicle 200.

The data acquiring unit 110 acquires various types of data. The data acquiring unit 110 receives, from the vehicle 200, data received by the short-distance radio communication unit included in the vehicle 200, for example. The vehicle 200 transmits, to the vehicle control apparatus 100, the card data received by the short-distance radio communication unit from the electronic card, for example.

Also, the data acquiring unit 110 acquires the notification data notifying that the emergency vehicle passes through the surrounding area of the vehicle 200, for example. The data acquiring unit 110 may receive the notification data from the vehicle 200. By recognizing the sound emitted by the emergency vehicle or analyzing the image captured by the in-vehicle camera, for example, the vehicle 200 detects the emergency vehicle and transmits the notification data to the vehicle control apparatus 100. Also, the data acquiring unit 110 may also receive the notification data via the network 10 from the monitoring apparatus that monitors a status of a vehicle that travels on a road in each location.

Also, the data acquiring unit 110 acquires a request for movement by automatic driving if the vehicle 200 is a vehicle that can be automatically driven, for example. For example, in a case where a valet parking for the vehicle 200 is performed, the vehicle 200 is automatically parked; however, if a state of charge (SOC) of the vehicle 200 is low, according to a charging space, the vehicle 200 may be moved to a usual parking space as the SOC becomes to be equal to or more than a certain value. In such a case, for example, the data acquiring unit 110 acquires the request for movement by automatic driving if the SOC of the vehicle 200 becomes to be equal to or more than a certain value.

The switching control unit 106 may cause the state switching unit 102 to switch the vehicle 200 to the acceptable state in a condition that the distance acquired by the distance acquiring unit 104 is equal to or less than the predetermined first threshold and the short-distance radio communication unit included in the vehicle 200 receives predetermined data. The predetermined data is card data of the electronic card, for example.

The card data may be data by which a person is identifiable. For example, the card data itself may be a name, an address and the like of a person. Also, for example, the card data is identification data unique to each electronic card, and the identification data and data, such as names, addresses and the like of persons, may also be managed in association with each other.

In a case where the switching control unit 106 causes the state switching unit 102 to switch the state of the vehicle 200 to the acceptable state under a condition that the short-distance radio communication unit included in the vehicle 200 receives the predetermined data, the history recording unit 112 records a history of the predetermined data. The history recording unit 112 records a history of card data by which a person is identifiable, for example. Accordingly, it can be possible to manage who has moved the vehicle 200, and unauthorized utilization can be suppressed.

The switching control unit 106 may also cause the state switching unit 102 to switch the state of the vehicle 200 to the acceptable state under a condition that the distance acquired by the distance acquiring unit 104 is equal to or less than the predetermined first threshold and the data acquiring unit 110 acquires the request for movement by automatic driving.

The position acquiring unit 116 acquires a position of the vehicle 200. The position acquiring unit 116 receives the position from the vehicle 200, for example. Also, for example, in a case where the parking area 30 is equipped with a monitoring apparatus that monitors a vehicle within a parking area 30, the position acquiring unit 116 may also receive the position of the vehicle 200 from the monitoring apparatus.

The switching control unit 106 may cause the state switching unit 102 to switch the state of the vehicle 200 to the acceptable state in a case where the vehicle 200 is in the non-acceptable state and the position of the vehicle 200 acquired by the position acquiring unit 116 is within a predetermined first region. After causing the state switching unit 102 to switch the state of the vehicle 200 to the acceptable state, the switching control unit 106 may cause the state switching unit 102 to switch the state of the vehicle 200 to the non-acceptable state in accordance with a situation in which the position of the vehicle 200 is out of a predetermined second region. The first region and the second region may be the same. Also, the first region and the second region may also be different from each other. For example, the second region may also be wider than the first region.

The switching control unit 106 may cause the state switching unit 102 to switch the state of the vehicle 200 to the acceptable state under a condition that the position of the vehicle 200 acquired by the position acquiring unit 116 is within the predetermined first region and the remaining charged amount indicated by the charge information acquired by the charge information acquiring unit 108 is equal to or more than the predetermined value. Also, the switching control unit 106 may cause the state switching unit 102 to switch the state of the vehicle 200 to the acceptable state under a condition that the position of the vehicle 200 acquired by the position acquiring unit 116 is within the predetermined first region and the charge information acquired by the charge information acquiring unit 108 indicates that the charging plug 22 is not connected to the vehicle 200. The switching control unit 106 may also cause the state switching unit 102 to switch the state of the vehicle 200 to the acceptable state under a condition that the position of the vehicle 200 acquired by the position acquiring unit 116 is within the predetermined first region and the short-distance radio communication unit included in the vehicle 200 receives the predetermined data. Also, the switching control unit 106 may also cause the state switching unit 102 to switch the state of the vehicle 200 to the acceptable state under a condition that the position of the vehicle 200 acquired by the position acquiring unit 116 is within the predetermined first region and the data acquiring unit 110 acquires the request for movement by automatic driving.

After the switching control unit 106 causes the state switching unit 102 to switch the state of the vehicle 200 to the acceptable state, the charging control unit 118 controls the charging facility 20 not to charge another vehicle until the vehicle 200 moves to a predetermined position. After the switching control unit 106 causes the state switching unit 102 to switch the state of the vehicle 200 to the acceptable state, for example, the charging control unit 118 transmits, to the charging facility 20, a control signal to instruct the charging facility 20 to stop to provide the charge service. Then, after detecting that the vehicle 200 moves to the predetermined position by the position acquired by the position acquiring unit 116, the charging control unit 118 transmits, to the charging facility 20, a control signal for causing the charging facility 20 to start to provide the charge service.

Note that if the vehicle 200 is a vehicle that can be automatically driven, the vehicle control apparatus 100 may also further include an automatic driving control unit (not shown in the drawings) that can control the automatic driving of the vehicle 200 via the network 10. For example, the automatic driving control unit transmits a control instruction to the control unit that is included in the vehicle 200 and that controls the automatic driving of the vehicle 200 to control the automatic driving of the vehicle 200. The control instruction includes information that indicates the position to which the vehicle 200 is to move. The automatic driving control that relates to determination of a course of the vehicle 200, collision avoidance and the like may be performed by the control unit included in the vehicle 200. After the switching control unit 106 causes the state switching unit 102 to switch the state of the vehicle 200 to the acceptable state, the automatic driving control unit may cause the vehicle 200 to move by automatic driving. The automatic driving control unit causes the vehicle 200 to move to a predetermined position, for example. The predetermined position may be a place which does not disturb the travelling of another vehicle, and the like. For example, the predetermined position is a parking space in which the charging facility 20 is not installed.

Although FIG. 1 to FIG. 5 are described by using an example in which the vehicle control apparatus 100 connected to the network 10 controls the vehicle 200, the vehicle 200 is not limited to this. The vehicle 200 may also include the vehicle control apparatus.

Figure 6:
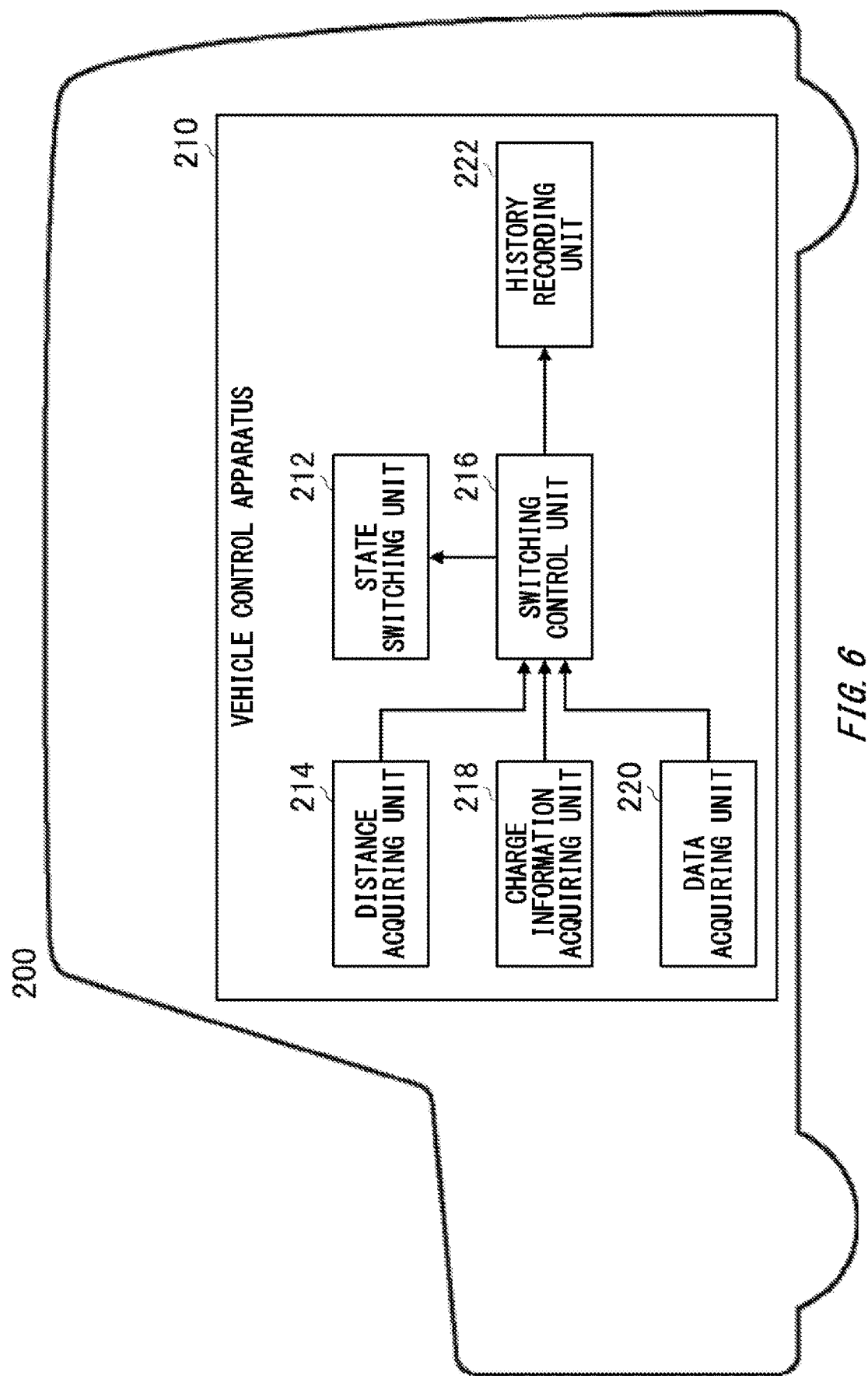
FIG. 6 schematically shows one example of a functional configuration of a vehicle 200.

FIG. 6 schematically shows one example of a functional configuration of the vehicle 200 including a vehicle control apparatus 210. The vehicle control apparatus 210 includes a state switching unit 212, a distance acquiring unit 214, a switching control unit 216, a charge information acquiring unit 218, a data acquiring unit 220 and a history recording unit 222. Here, different respects from the state switching unit 102, the distance acquiring unit 104, the switching control unit 106, the charge information acquiring unit 108, the data acquiring unit 110 and the history recording unit 112 are mainly described.

The state switching unit 212 switches the state of the vehicle 200 between the acceptable state and the non-acceptable state. The distance acquiring unit 214 acquires a distance between the vehicle 200 and the charging facility 20. The distance acquiring unit 214 measures, by any method, the distance between the vehicle 200 and the charging facility 20, for example. Also, the distance acquiring unit 214 receives, from the charging facility 20, the distance between the vehicle 200 and the charging facility 20, for example. The distance acquiring unit 214 may also receive the distance between the vehicle 200 and the charging facility 20 from the monitoring apparatus that monitors the charging facility 20.

The charge information acquiring unit 218 acquires the charge information that indicates a charging status of the vehicle 200 by the charging facility 20. The charge information acquiring unit 218 may monitor the charging status from the charging facility 20. Also, the charge information acquiring unit 218 may also receive the charge information from the charging facility 20.

The data acquiring unit 220 acquires various types of data. The data acquiring unit 110 receives, from the short-distance radio communication unit, data received by the short-distance radio communication unit included in the vehicle 200, for example. Also, the data acquiring unit 220 acquires notification data that notifies that an emergency vehicle passes through a surrounding area of the vehicle 200, for example. The data acquiring unit 220 receives the notification data from an emergency vehicle detecting unit that detects an emergency vehicle by recognizing a sound emitted by the emergency vehicle or analyzing an image captured by an in-vehicle camera, for example. The data acquiring unit 220 may also receive the notification data via the network 10 from a monitoring apparatus that monitors a status of a vehicle that travels on a road of each location.

Figure 7:
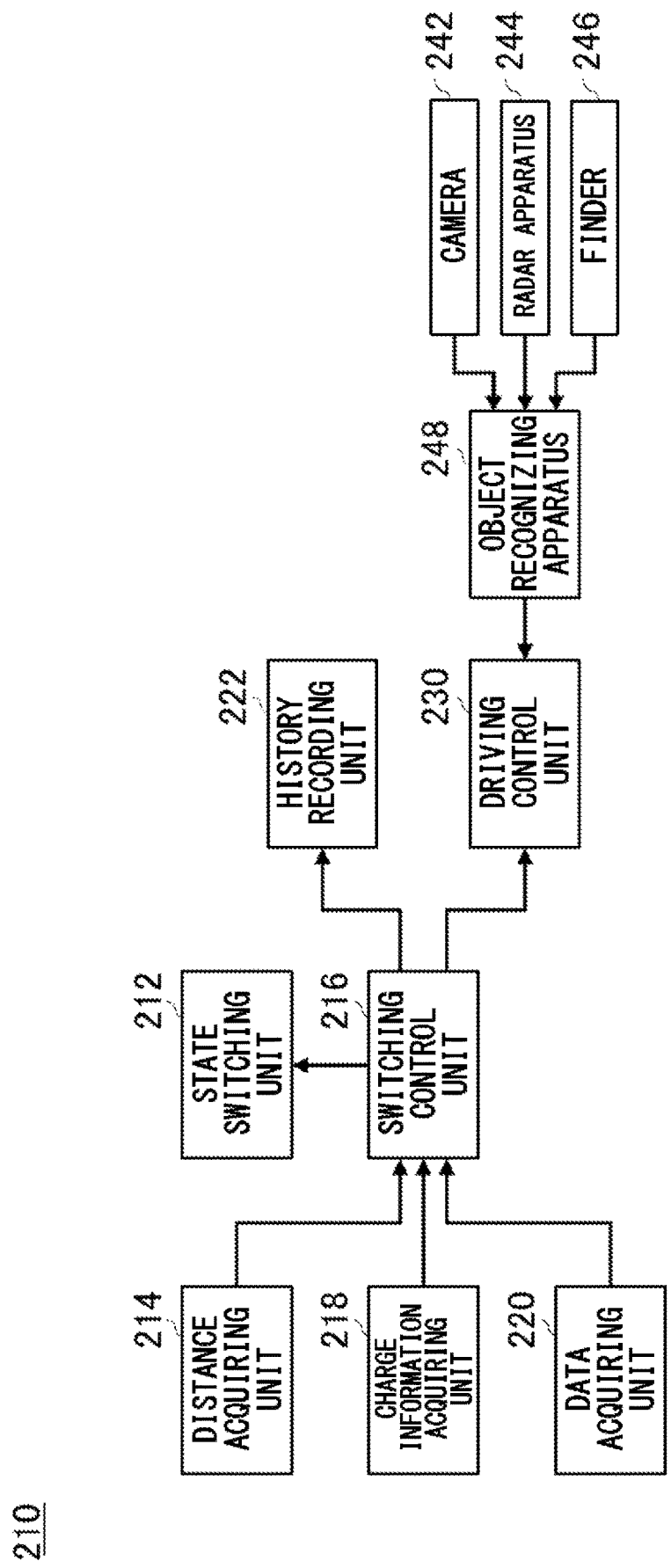
FIG. 7 schematically shows another example of a functional configuration of a vehicle control apparatus 210.

FIG. 7 schematically shows another example of the functional configuration of the vehicle control apparatus 210. Here, different respects from the vehicle control apparatus 210 shown in FIG. 6 are mainly described. The vehicle control apparatus 210 shown in FIG. 7 includes a state switching unit 212, a distance acquiring unit 214, a switching control unit 216, a charge information acquiring unit 218, a data acquiring unit 220, a history recording unit 222, a driving control unit 230, a camera 242, a radar apparatus 244, a finder 246 and an object recognizing apparatus 248. Note that the vehicle control apparatus 210 does not necessarily include all of these components.

The driving control unit 230 may control the automatic driving of the vehicle 200. That is, by using an image detecting apparatus and a detecting apparatus, such as a radar, with which the vehicle 200 is equipped, or position information and map information, the driving control unit 230 causes a vehicle to travel, stop and turn by itself without a steering or accelerator pedal manipulation, a brake pedal manipulation and a gear shift manipulation by a driver. After the switching control unit 216 causes the state switching unit 212 to switch the state of the vehicle 200 to the acceptable state, the driving control unit 230 may cause the vehicle 200 to move by the automatic driving. The driving control unit 230 causes the vehicle 200 to move to a predetermined position, for example. The predetermined position may be a place that does not disturb the travelling of another vehicle, and the like. For example, the predetermined position is a parking space in which the charging facility 20 is not installed.

The camera 242 is a digital camera that utilizes a solid-state image-capturing device such as a charge coupled device (CCD) or a complementary metal oxide semiconductor (COMS), for example. One or more cameras 242 are mounted on any place of the vehicle 200. In a case where a front image is to be captured, the camera 242 is mounted on an upper portion of a front window shield, a back side of a room mirror, or the like. The camera 242 periodically and repeatedly captures images of the surrounding area of the vehicle 200, for example. The camera 242 may also be a stereo camera.

The radar apparatus 244 irradiates a radio wave, such as a millimeter wave, on the surrounding area of the vehicle 200, and detects a radio wave (reflected wave) reflected by an object to detect at least a position (a distance and a direction) of the object. One or more radar apparatuses 244 are mounted on any place of the vehicle 200. The radar apparatus 244 may also detect a position and a speed of an object by a frequency modulated continuous wave (FM-CW) manner.

The finder 246 is a light detection and ranging (LIDAR). The finder 246 irradiates light on the surrounding area of the vehicle 200 and measures scattered light. The finder 246 detects a distance to a target based on a period of time from a time when the light is emitted to a time when the light is received. The irradiated light is, for example, pulse-like laser light. One or more finders 246 are mounted on any place of the vehicle 200.

The object recognizing apparatus 248 performs a sensor fusion process on detection results that are obtained by some or all of the camera 242, the radar apparatus 244 and the finder 246 to recognize a position, a type, a speed and the like of the object. The object recognizing apparatus 248 outputs a recognition result to the driving control unit 230. Also, the object recognizing apparatus 248 may output, to the driving control unit 230, the detection results, as it is, of the camera 242, the radar apparatus 244 and the finder 246 if necessary.

The driving control unit 230 may have a position acquiring unit that acquires the position of the vehicle 200. The position acquiring unit receives the position of the vehicle 200 from the navigation apparatus included in the vehicle 200, for example. The navigation apparatus of the vehicle 200 has a global navigation satellite system (GNSS) receiver, for example, and the GNSS receiver identifies the position of the vehicle 200 based on a signal received from a GNSS satellite. Note that the position acquiring unit may also have the GNSS receiver.

The driving control unit 230 may carry first map information including map information of the surrounding area of the charging facility 20. The driving control unit 230 receives the first map information via the network 10, for example. The driving control unit 230 may receive the first map information from the management apparatus that manages the charging facility 20. Also, the driving control unit 230 may also receive the first map information from the charging facility 20. Also, the driving control unit 230 may also receive the first map information from a map management server that manages map information of each location. The first map information is information in which a road shape is represented by a link indicating a road and a node connected by the link, for example. The first map information may also include a road curvature, point of interest (POI) information or the like. The first map information may be updated any time.

The driving control unit 230 may also further carry second map information including map information of the surrounding area of the charging facility 20. The driving control unit 230 may receive the second map information via the network 10, similar to the first map information. The second map information is map information in higher precision than the first map information. The second map information includes information of a center of a lane or information of a lane boundary and the like, for example. Also, the second map information may include road information, traffic regulation information, address information (an address, postal code), facility information, phone number information and the like. The second map information may be updated any time.

The driving control unit 230 may cause the vehicle 200 to move to a predetermined position by using the position acquired by the position acquiring unit, the information received from the object recognizing apparatus 248 and the first map information. The driving control unit 230 may cause the vehicle 200 to move to the predetermined position by further using the second map information.

Figure 8:
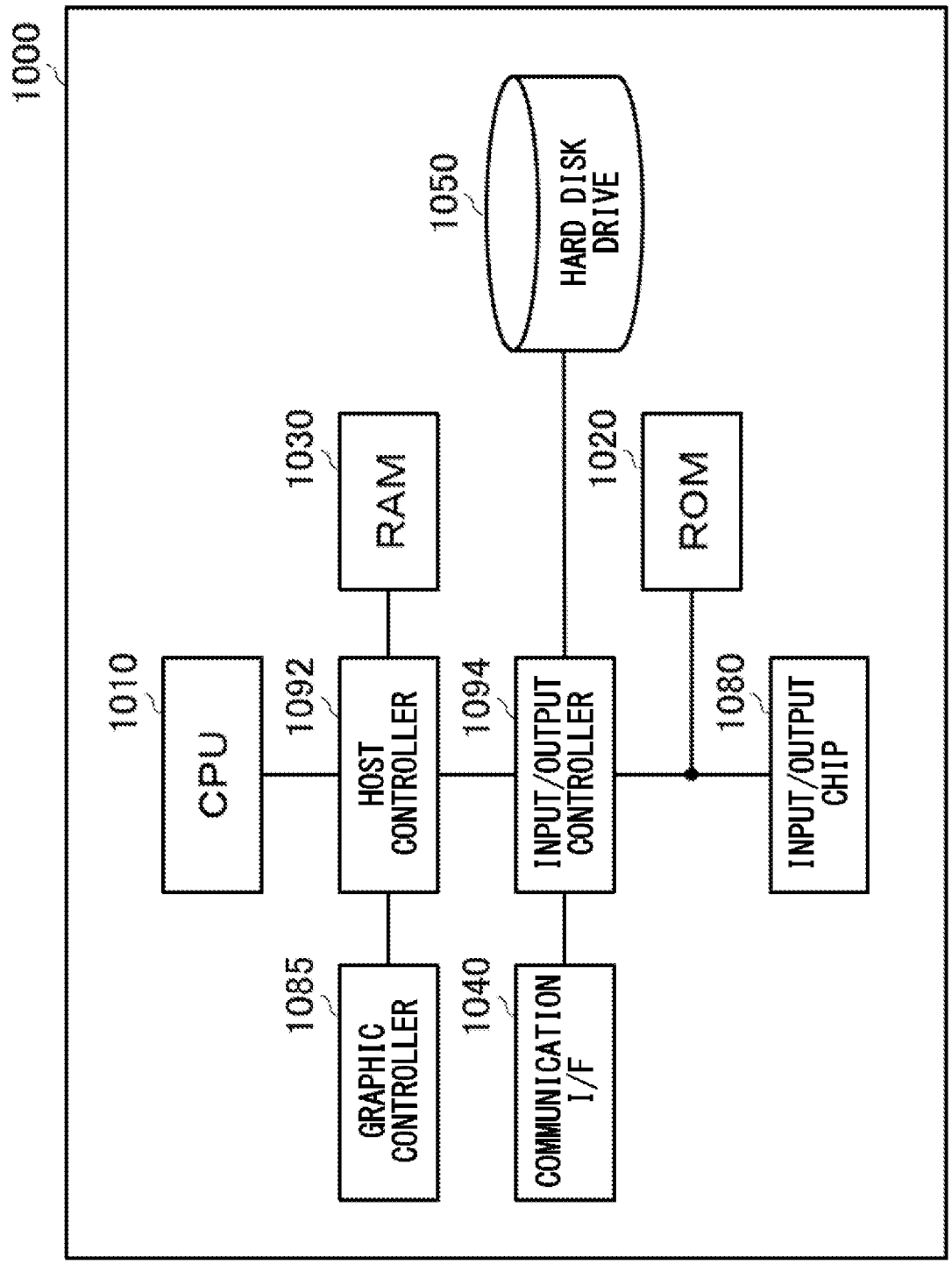
FIG. 8 schematically shows one example of a hardware configuration of a computer 1000 that serves as the vehicle control apparatus 100.

FIG. 8 schematically shows one example of a computer 1000 that serves as the vehicle control apparatus 100 or the vehicle control apparatus 210. The computer 1000 according to the present embodiment includes a CPU periphery portion having a CPU 1010, a RAM 1030 and a graphic controller 1085 which are mutually connected by a host controller 1092, and an input/output portion having a ROM 1020, a communication I/F 1040, a hard disk drive 1050 and an input/output chip 1080 which are connected to the host controller 1092 by an input/output controller 1094.

The CPU 1010 operates based on a program stored in the ROM 1020 and the RAM 1030 to perform control on each portion. The graphic controller 1085 acquires image data generated by the CPU 1010 and the like on a frame buffer provided within the RAM 1030, and displays the image data on a display. Alternatively, the frame buffer storing the image data generated by the CPU 1010 and the like may also be included within the graphic controller 1085.

The communication I/F 1040 may communicate with another apparatus via a wired or wireless network. Also, the communication I/F 1040 serves as hardware performing the communication. The hard disk drive 1050 stores a program and data used by the CPU 1010.

The ROM 1020 stores a boot program being executed by the computer 1000 at a start-up time, a program depending on hardware of the computer 1000, and the like. The input/output chip 1080 connects, to the input/output controller 1094, various input/output apparatuses via a parallel port, a serial port, a keyboard port, a mouse port and the like, for example.

The program provided to the hard disk drive 1050 via the RAM 1030 is stored in a recording medium such as an IC card, and is provided by a user. The program is read out from a recording medium, installed in the hard disk drive 1050 via the RAM 1030, and executed on the CPU 1010.

The program that is installed in the computer 1000 and causes the computer 1000 to serve as the vehicle control apparatus 100 may be executed by the CPU 1010 and the like to cause the computer 1000 to respectively serve as each unit of the vehicle control apparatus 100. By reading the information processing described in these programs, the computer 1000 serves as the state switching unit 102, the distance acquiring unit 104, the switching control unit 106, the charge information acquiring unit 108, the data acquiring unit 110, the history recording unit 112, the automatic driving control unit, the position acquiring unit 116 and the charging control unit 118 which are specific means in which software and the above-mentioned various hardware resources cooperate with each other. Then, by realizing an operation or processing on the information in accordance with a use purpose of the computer 1000 in the present embodiment by these specific means, the vehicle control apparatus 100 particularly suitable for the use purpose is constructed.

The program that is installed in the computer 1000 and causes the computer 1000 to serve as the vehicle control apparatus 210 may be executed by the CPU 1010 and the like to cause the computer 1000 to respectively serve as each unit of the vehicle control apparatus 210. By reading the information processing described in these programs, the computer 1000 serves as the state switching unit 212, the distance acquiring unit 214, the switching control unit 216, the charge information acquiring unit 218, the data acquiring unit 220 and the history recording unit 222 which are specific means in which software and the above-mentioned various hardware resources cooperate with each other. Also, by reading the information processing described in these programs, the computer 1000 serves as the state switching unit 212, the distance acquiring unit 214, the switching control unit 216, the charge information acquiring unit 218, the data acquiring unit 220, the history recording unit 222 and the driving control unit 230 which are specific means in which software and the above-mentioned various hardware resources cooperate with each other. Then, by realizing the operation or processing of the information in accordance with the use purpose of the computer 1000 in the present embodiment by these specific means, the vehicle control apparatus 210 particularly suitable for the use purpose is constructed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 . . . network; 20 . . . charging facility; 22 . . . charging plug; 30 . . . parking area; 42 . . . wall; 44 . . . wall; 100 . . . vehicle control apparatus; 102 . . . state switching unit; 104 . . . distance acquiring unit; 106 . . . switching control unit; 108 . . . charge information acquiring unit; 110 . . . data acquiring unit; 112 . . . history recording unit; 116 . . . position acquiring unit; 118 . . . charging control unit; 150 . . . threshold; 200 . . . vehicle; 210 . . . vehicle control apparatus; 212 . . . state switching unit; 214 . . . distance acquiring unit; 216 . . . switching control unit; 218 . . . charge information acquiring unit; 220 . . . data acquiring unit; 222 . . . history recording unit; 230 . . . driving control unit; 242 . . . camera; 244 . . . radar apparatus; 246 . . . finder; 300 . . . parked vehicle; 310 . . . vehicle; 400 . . . emergency vehicle; 1000 . . . computer; 1010 . . . CPU; 1020 . . . ROM; 1030 . . . RAM; 1040 . . . communication I/F; 1050 . . . hard disk drive; 1080 . . . input/output chip; 1085 . . . graphic controller; 1092 . . . host controller; 1094 . . . input/output controller

What is claimed is:

1. A vehicle control apparatus comprising a processor configured to:
   switch a state of a vehicle between a first state in which the vehicle accepts a driving manipulation and a second state in which the vehicle does not accept a driving manipulation;
   acquire a distance between the vehicle and a charging facility;
   cause the state of the vehicle to be switched to the first state if the vehicle is in the second state and the distance is equal to or less than a predetermined threshold; and
   cause the vehicle to move by automatic driving after the processor causes the state of the vehicle to be switched to the first state.

2. The vehicle control apparatus according to claim 1, wherein the processor causes the state of the vehicle to be switched to the first state further if a remaining charged amount of an electrical storage device of the vehicle is equal to or more than a predetermined value.

3. The vehicle control apparatus according to claim 1, wherein the processor causes the state of the vehicle to be switched to the first state further if a charging plug of the charging facility is not connected to the vehicle.

4. The vehicle control apparatus according to claim 1, wherein after the state of the vehicle is switched to the first state, the processor causes the state of the vehicle to be switched to the second state in accordance with a situation in which the distance between the vehicle and the charging facility increases to exceed the predetermined threshold.

5. The vehicle control apparatus according to claim 1, wherein
   the processor causes the state of the vehicle to be switched to the first state if a first condition is satisfied while the vehicle is in the second state, and
   provided that the vehicle is in the second state and the distance is equal to or less than the predetermined threshold, the processor causes the state of the vehicle to be switched to the first state, even if the first condition is not satisfied.

6. The vehicle control apparatus according to claim 5, wherein
   the first condition is that a key inserted into a key cylinder of the vehicle is turned,
   the processor causes the state of the vehicle to be switched to the first state if the key inserted into the key cylinder of the vehicle is turned while the vehicle is in the second state, and
   provided that the vehicle is in the second state and the distance is equal to or less than the predetermined threshold, the processor causes the state of the vehicle to be switched to the first state, even if the key inserted into the key cylinder of the vehicle is not turned.

7. The vehicle control apparatus according to claim 5, wherein
   the first condition is that a start switch of the vehicle is in an ON state, the processor causes the state of the vehicle to be switched to the first state if the start switch of the vehicle is set in the ON state while the vehicle is in the second state, and provided that the vehicle is in the second state and the distance is equal to or less than the predetermined threshold, the processor causes the state of the vehicle to be switched to the first state, even if the start switch of the vehicle is not set in the ON state.

8. The vehicle control apparatus according to claim 1, wherein the processor causes the state of the vehicle to be switched to the first state further if a request for movement by automatic driving is made.

9. The vehicle control apparatus according to claim 1, wherein the processor causes the state of the vehicle to be switched to the first state further if an emergency vehicle passes through a surrounding area of the vehicle.

10. The vehicle control apparatus according to claim 1, wherein the processor causes the state of the vehicle to be switched to the first state further if a short-distance radio communication unit included in the vehicle receives predetermined data.

11. The vehicle control apparatus according to claim 10, wherein the predetermined data is data by which a person is identifiable, the processor is further configured to:

record a history of the predetermined data if the processor causes the state of the vehicle to be switched to the first state.

12. The vehicle control apparatus according to claim 1, wherein the processor is further configured to:

after the processor causes the the state of the vehicle to be switched to the first state, control the charging facility not to charge another vehicle until the vehicle moves to a predetermined position.

13. The vehicle control apparatus according to claim 1, wherein if the vehicle is in the second state and the distance is equal to or less than the predetermined threshold, the processor causes the state of the vehicle to be switched to the first state, and performs a control to unlock a door lock of the vehicle.

14. A vehicle having a controlled switchable state, comprising:

a vehicle; and the vehicle control apparatus according to claim 1, operatively connected thereto.

15. A non-transitory computer readable storage medium with a program stored thereon, the program causing a computer to:

switch a state of a vehicle between a first state in which the vehicle accepts a driving manipulation and a second state in which the vehicle does not accept a driving manipulation;

acquire a distance between the vehicle and a charging facility;

cause the state of the vehicle to be switched to the first state if the vehicle is in the second state and the distance is equal to or less than a predetermined threshold; and cause the vehicle to move by automatic driving after the processor causes the state of the vehicle to be switched to the first state.

* * * * *